United States Patent [19]

Jacobi et al.

[11] Patent Number: 6,064,980

[45] Date of Patent: May 16, 2000

[54] SYSTEM AND METHODS FOR COLLABORATIVE RECOMMENDATIONS

[75] Inventors: Jennifer A. Jacobi; Eric A. Benson, both of Seattle, Wash.

[73] Assignee: Amazon.com, Inc., Seattle, Wash.

[21] Appl. No.: 09/040,171

[22] Filed: Mar. 17, 1998

[51] Int. Cl.[7] ................................................ G06F 17/60
[52] U.S. Cl. ............................ 705/26; 705/1; 705/27
[58] Field of Search ................................. 705/26, 27, 1

[56] References Cited

U.S. PATENT DOCUMENTS

| | | | |
|---|---|---|---|
| 4,870,579 | 9/1989 | Hey | 364/419 |
| 4,996,642 | 2/1991 | Hey | 395/61 |
| 5,704,017 | 12/1997 | Heckerman et al. | 705/27 |
| 5,790,426 | 8/1998 | Robinson | 364/554 |
| 5,897,622 | 4/1999 | Blinn et al. | 705/26 |
| 5,905,973 | 5/1999 | Yanezawa et al. | 705/27 |
| 5,918,014 | 6/1999 | Robinson | 395/200.49 |

FOREIGN PATENT DOCUMENTS

| | | | |
|---|---|---|---|
| 0751471 | 1/1997 | European Pat. Off. | G06F 17/60 |

OTHER PUBLICATIONS

Social Information Filtering: Algorithms for automating "Word of Mouth", 8 pages (undated). By Upendra Shardanand and Pattie Maes.

*Primary Examiner*—Emanuel Todd Voeltz
*Assistant Examiner*—William R. McCarty

*Attorney, Agent, or Firm*—Knobbe, Martens, Olson & Bear, LLP

[57] ABSTRACT

A recommendation service is disclosed which uses collaborative filtering techniques to recommend books to users of a Web site. The Web site includes a catalog of the various titles that can be purchased via the site. The recommendation service includes a database of titles that have previously been rated and that can therefore be recommended by the service using collaborative filtering methods. At least initially, the titles and title categories (genres) that are included within this database (and thus included within the service) are respective subsets of the titles and categories included within the catalog. As users browse the site to read about the various titles contained within the catalog, the users are presented with the option of rating specific titles, including titles that are not currently included within the service. The ratings information obtained from this process is used to automatically add new titles and categories to the service. The breadth of categories and titles covered by the service thus grows automatically over time, without the need for system administrators to manually collect and input ratings data. To establish profiles for new users of the service, the service presents new users with a startup list of titles, and asks the new users to rate a certain number of titles on the list. To increase the likelihood that new users will be familiar with these titles, the service automatically generates the startup list by identifying the titles that are currently the most popular, such as the titles that have been rated the most over the preceding week.

26 Claims, 11 Drawing Sheets

SYSTEM AND METHODS FOR COLLABORATIVE RECOMMENDATIONS

FIELD OF THE INVENTION

The present invention relates to collaborative filtering systems of the type used to generate product or service recommendations to users of an interactive computer network. More particularly, the present invention relates to techniques for automatically populating a collaborative filtering service with new product/service selections and categories, and for efficiently collecting ratings data from individual users.

BACKGROUND OF THE INVENTION

In the field on Internet commerce, it is known for online merchants to provide automated services for recommending products and/or services to potential customers. For example, a merchant that sells products over a Web site may provide the site with a recommendation service which uses the customer's prior purchasing history to predict additional products that may be of interest to the customer. These personalized product recommendations may be communicated to the customer via an email message, a dynamically-generated Web page, or some other communications method.

One method that is commonly used to generate the personalized recommendations is known as collaborative filtering. Collaborative filtering systems operate generally by asking each user to rate items (products or services) the user is familiar with, and storing these ratings within user-specific rating profiles. To identify the items that may be of interest to a particular user, the service correlates the user's rating profile to the profiles of other users to identify users with similar tastes.

For example, in the context of online book sales, suppose that a first user hates title 1, is indifferent about title 2, and likes titles 3 and 4; and that a second user hates title 1, is indifferent about title 2, likes title 3, and has not yet read title 4. A collaborative filtering system might use this information to predict that the second user will like title 4. When applied over large databases of user ratings data, this type of analysis can produce predictions that are valuable to both users and merchants.

One problem with collaborative filtering is that an item cannot be recommended until that item has been rated by a user who has rated other items. As a result, before a collaborative filtering service can be brought online, the service normally must be populated with ratings data for the items to be covered by the service. This may be accomplished, for example, by having a group of users rate the items to be included within the service prior to the service's release, and entering the resulting ratings data into the service's database.

While this method may work well for merchants that have relatively small, static product catalogs, the method is inadequate for merchants having large and/or constantly-changing product catalogs. For example, in the context of an Internet bookstore that carries millions of titles, it would be extremely difficult to find a test group that could rate a significant portion of the product catalog. In addition, even if such a test group could be identified, the task of collecting and entering the user ratings data for such a large number of titles would be daunting. In addition, if the service is to cover new product offerings, the task would have to be repeated as new titles are released.

As a result of these and other limitations in existing collaborative filtering systems, existing systems are commonly "static," meaning that they provide recommendations only with respect to a fixed set of items. In addition, the items covered by such recommendation services are typically well-known items for which ratings data can easily be obtained.

Another problem with collaborative filtering systems relates to the task of building rating profiles for new users of the system. Typically, the service handles this task by asking the user to rate some minimum number of the items that are covered by the service. This can be a frustrating task to a user that is familiar with only a small portion of the covered items, and can lead to the loss of potential customers.

The present invention addresses these and other problems with existing collaborating filtering systems.

SUMMARY OF THE INVENTION

The present invention provides a recommendation service which uses collaborative filtering techniques to recommend items (products and/or services) to users of a Web site or other network-based information system. In a preferred embodiment, the service is implemented on a Web site that includes a browsable catalog of items that can be purchased via the site. The items are arranged within the catalog in a plurality of categories that are referred to in this summary as the "catalog categories." The catalog items that can currently be recommended by the service are referred to in this summary as the "service items," and the categories in which these items fall are referred to as the "service categories." As described below, the present invention provides methods for automatically populating the recommendation service with service items and service categories that are included within the catalog.

In accordance with the invention, the recommendation service is initially brought on-line on the Web site with a relatively small set of service items which fall within a relatively small set of service categories. For example, if the catalog includes 2,000,000 book titles (items) which fall within 30 genres (categories), the service may be brought on-line with 1000 relatively popular titles that fall within four of the more popular genres. The initial service items are preferably items that have been rated by a group of "pre-release" users. The user ratings data for the initial set of service items is stored within a recommendation service database.

In operation, users of the service are asked to rate a minimum number (e.g. 20) of the service items, and can then request and view the service's recommendations of other service items. Recommendations can be requested separately in each of the currently-existing service categories.

An important feature of the invention is the ability of the recommendation service to automatically populate the recommendation service database (and thus the recommendation service) with new items and categories from the catalog. This is preferably accomplished by presenting users of the service with the option of rating catalog items, including non-service items, throughout the various areas of the Web site. When a user rates a non-service item, the service initially determines whether the item falls within one of the then-existing service categories. If it does, the item is added to the recommendation service by recording the rating event within the recommendation service database.

If, on the other hand, the item falls within a non-service category, the item and associated user rating are stored within a pending items database. This database acts as a collection bin for collecting ratings data (items and user ratings) for the various non-service categories. (With collaborative filtering type recommendation services that provide category-specific recommendations, it is generally undesirable to add a category to the recommendation service until the number of rated items within that category is high enough for the service to generate reliable recommendations.) Once a sufficient number of items (e.g., 300) within a given non-service category have been rated, the category and associated ratings data are added to the service by moving the data over to the recommendation service database.

Thus, in contrast to prior art systems, the breadth (items and categories) of the service grows automatically over time, and the problems associated with manually obtaining and entering ratings data for large and/or constantly changing catalogs are eliminated.

Another feature of the invention relates to a method used by the recommendation service to establish a ratings profile for new users. The feature involves the periodic execution of a process which identifies the service items that are currently the most popular. The process may identify such items, for example, by identifying the service items that have been rated the most over some period of time. The most popular items are then included within a startup list that is used to generate ratings profiles for the new users. When a new user joins the service, items from the startup list are presented to the user and the user is asked to rate these items. Because the items on the startup list have high currently popularity ratings, the likelihood that new users will be able to rate the service items without becoming frustrated is increased.

To further increase the likelihood that new users will be familiar with the presented items, the startup list is preferably filtered based on category preference information specified by the user. The filtered version of the list is then presented to the new user for rating.

DETAILED DESCRIPTION OF A PREFERRED EMBODIMENT

A book recommendation service which operates in accordance with the invention will now be described with reference to the drawings. Throughout this description, reference will be made to various implementation-specific details of the service as implemented on the Web site of Amazon.com. These details are provided in order to fully set forth a preferred embodiment of the invention, and not to limit the scope of the invention; the scope of the invention is defined only by the appended claims. Thus, for example, although the invention is described in the context of a recommendation service for books, the invention is also applicable to recommendation services for recommending movies, recorded music, restaurants, news services, television shows, and other types of products and services.

The service, referred to as the BookMatcher[SM] service, is one of several book recommendation services that are implemented on the Amazon.com Web site. The service operates generally by asking the user to rate specific titles, and then using this information, in combination with ratings data provided by other users, to generate and return lists of recommended books. The Amazon.com site also provides a variety of different services for allowing users to efficiently browse and make purchases from a catalog of over two million titles.

Figure 1:
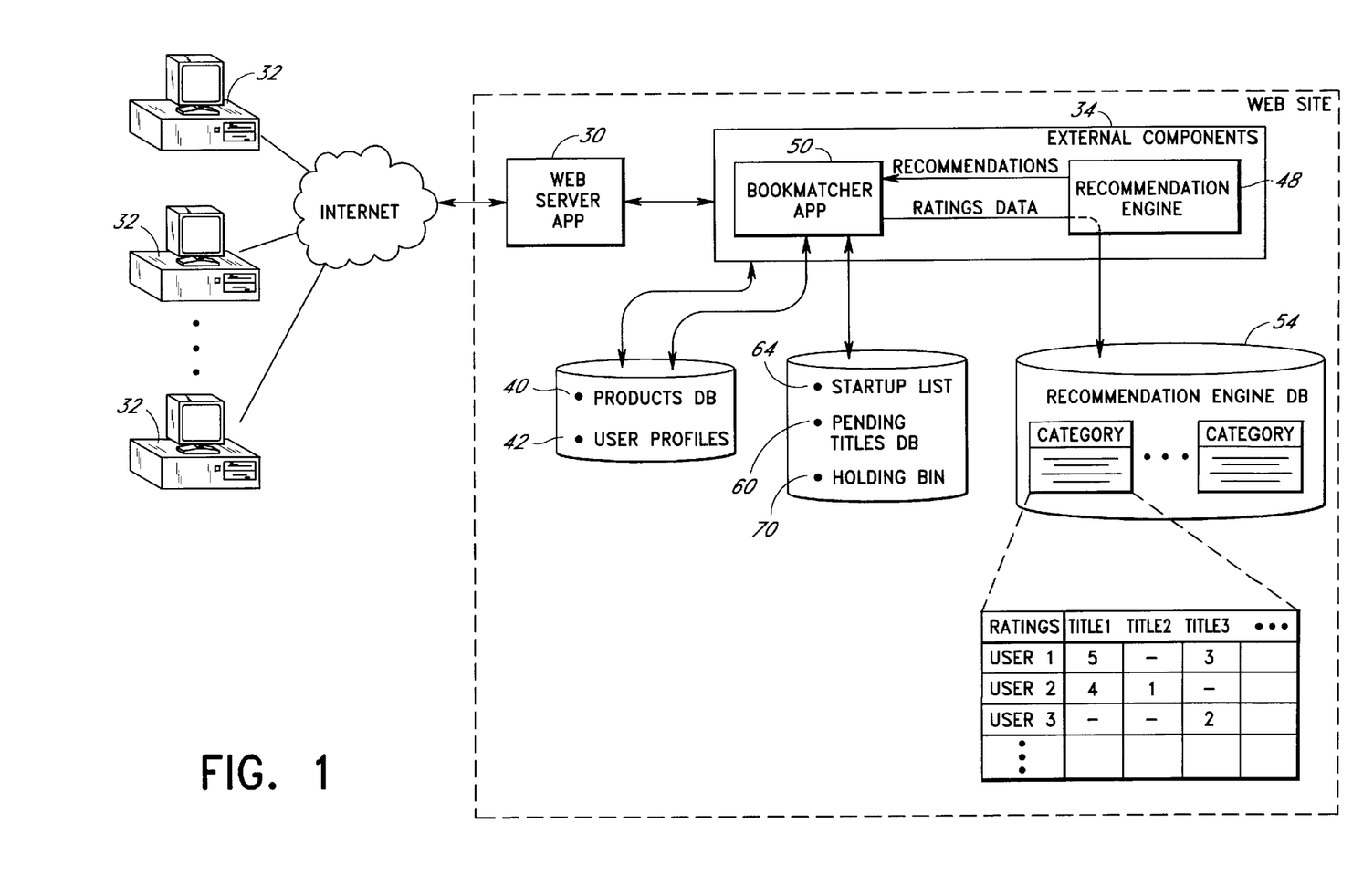
FIG. 1 illustrates the basic Web site components used to implement a recommendation service in accordance with one embodiment of the invention.
Figure 2:
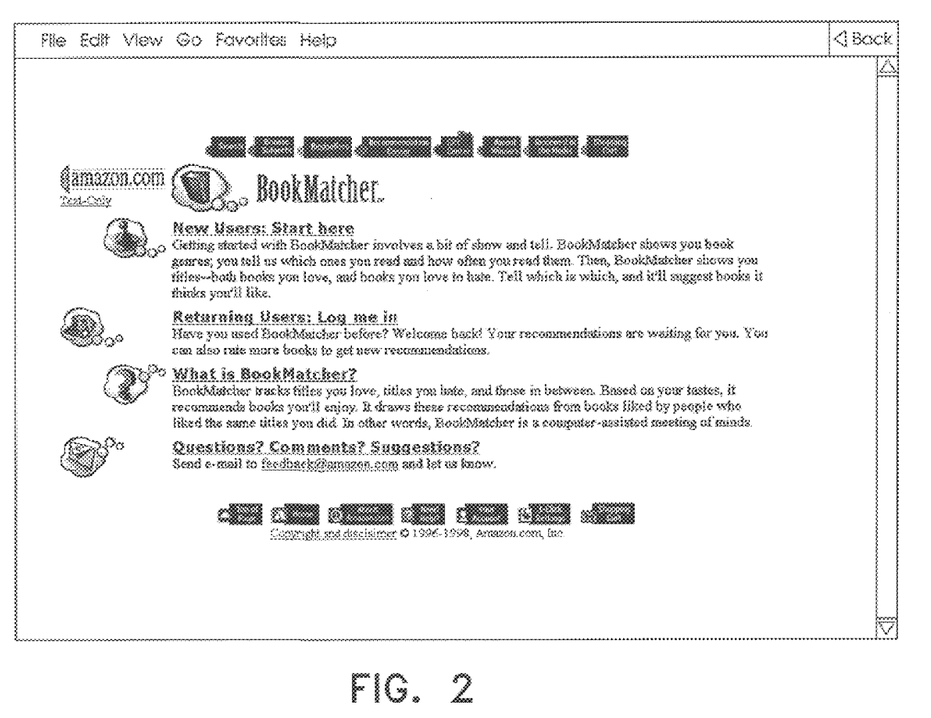
FIG. 2 illustrates an introductory Web page of the service.

FIG. 1 illustrates the basic components of the Web site, with emphasis on the software and database components that are used to implement the BookMatcher service. (As used herein, the term "Web site" refers to a network site that serves content using the protocols of the World Wide Web; and the term "web site" refers more generally to a network site that provides access to content using a data transfer protocol that supports the use of hyperlinks.) The Web site includes a Web server application 30 which serves Web pages over the Internet to the computers 32 of end users. The site also includes a database (not shown) of interlinked Web pages that can be accessed over the Internet using an HTML-compliant browser program.

The Web server application 30 communicates with various external components 34 which implement the various end-user services (search engines, recommendation services, transaction processing services, etc.) of the site. As depicted in FIG. 1, the external components 34 provide access to the site's various databases. These databases include a products database 40 which contains product information (author, title, ISBN, description, price, etc.) for the various books and other items that are available for purchase from the site. The products database 40 includes over two million titles that are categorized within 22 different genres or "categories." A "user profiles" database 42 is also provided to store information (name, shipping address, payment information, purchase history, service membership, etc.) about users that have previously shopped from the site.

With further reference to FIG. 1, the BookMatcher service is implemented primarily using two external components—a recommendation engine 48 and the BookMatcher application 50. The recommendation engine 48 is the Grouplens™ product available from Net Perceptions, although other types or brands of recommendation engines that use collaborative filtering techniques could be used. The BookMatcher application 50 consists of executable software modules which implement various processes of the service. The recommendation engine 48 and the BookMatcher application 50 preferably run on computers that are connected by a local area network to the Web site's main physical servers, but could alternatively run on a remote site.

As depicted in FIG. 1, the BookMatcher application 50 operates generally by sending ratings data to the recommendation engine 48, and by receiving personalized recommendations from the recommendation engine. The ratings data is generated as users rate specific titles. For example, a user may give the book *The Firm* a high rating, and may give the book *The Catcher in the Rye* a low rating. The recommendation engine 48 stores the ratings data in a recommendation engine database 54, and uses the information stored within this database to generate recommendations. The recommendations are predictions of titles the user will like, and are generated by correlating the user's ratings with those of other users. The correlation algorithms used by the recommendation engine 48 to generate the recommendations are not important to the present invention. To increase the likelihood of successful predictions, the user is required to rate a minimum number (e.g., 20) of books before requesting the service's recommendations.

As depicted by FIG. 1 for a single category, the data represented within the recommendation engine database 54 includes titles (represented by title IDs), users (represented by user IDs), and scores. Each score value represents a rating of a specific title (shown on a scale of 1–5) by a specific user. For example, in the hypothetical table shown, user 1 has rated titles 1 and 3 with scores of five and three (respectively) and has not rated title 2. The FIG. 1 table is intended only to illustrate the types of data that are included within the database 54 in a particular implementation, and is not intended to imply a specific database format used by the recommendation engine to store such data.

The titles that exist within the recommendation engine database 54 are referred to herein as the "BookMatcher titles," and are the titles that can be recommended by the service. As with conventional collaborative filtering systems, a title must be rated (i.e., must have at least one user-assigned score) before the title can be added to this database 54 and recommended. In general, the BookMatcher titles are a relatively small subset (e.g., 20,000 titles) of the titles that are represented within the products database 40. As described below, however, the quantity of BookMatcher titles grows automatically as the result of use of the Amazon.com site by end users.

The categories (genres) that are covered by the BookMatcher service are referred to herein as the "BookMatcher categories." As depicted in FIG. 1, each BookMatcher title falls within at least one of the BookMatcher categories. In a current implementation, there are a total of five BookMatcher categories: Popular Fiction, Science Fiction & Fantasy, Mystery & Suspense, Classic Literature, and Romance. Once a user has rated a sufficient number of titles to request recommendations, the user can request BookMatcher's recommendations within a specific BookMatcher category, or can request BookMatcher's recommendations generally.

Seventeen categories exist within the products database 40 that do not exist within the BookMatcher service. Each of these seventeen categories is a candidate for a new category to be added to the BookMatcher service in the future. To ensure that the recommendations within each category are of consistently high quality, it is preferable to add a new category to the service only if ratings data exists for a sufficiently high number (e.g., 300) of titles within that category.

An important feature of the invention is the ability for the BookMatcher service to automatically add new titles to the service, and to facilitate the addition of (or optionally, to automatically add) new categories to the service. This is accomplished in-part by presenting users of the service with the option of rating books that are not currently BookMatcher titles, and then using the ratings information obtained by this process to automatically augment the service. To increase the effectiveness of this process, BookMatcher users are presented with the option of rating titles throughout the various areas of the site, including areas that are not part of the BookMatcher service.

In accordance with this feature of the invention, the BookMatcher service was initially brought online on the Amazon.com site with a "core" set of BookMatcher categories (Popular Fiction, Science Fiction & Fantasy, Mystery & Suspense, and Classic Literature), and with a core set of titles within each of these categories. The core titles are well known titles for which pre-existing ratings data (book reviews, awards, etc.) is readily available. As BookMatcher users browse the various areas of the site, the users are presented with the option of rating the titles they browse, including non-BookMatcher titles and titles in non-BookMatcher categories. As new books that fall within the BookMatcher categories are rated by end users, these new books are automatically added to the service by adding the ratings data to the recommendation engine database 54.

In addition, as books that fall outside the BookMatcher categories are rated, this ratings data is collected and stored within a special "pending titles" database 60. Once a sufficient number (e.g., 300) of rated titles exist within a non BookMatcher category, the new category is added to the BookMatcher service. This is accomplished by moving the collected ratings data for the new category from the pending titles database 60 to the recommendation engine database 54. For example, once a sufficient number of autobiographies have been rated, the Autobiographies category can be added to the service by moving the collected ratings data for such titles to the recommendation engine database 54.

Thus, in contrast to prior art systems, the scope (titles and categories) of the service grows automatically over time, and the problems associated with manually generating and entering ratings data are eliminated. The various processes that are used to augment the service are implemented primarily within the BookMatcher application 50 and are described below.

Figure 3:
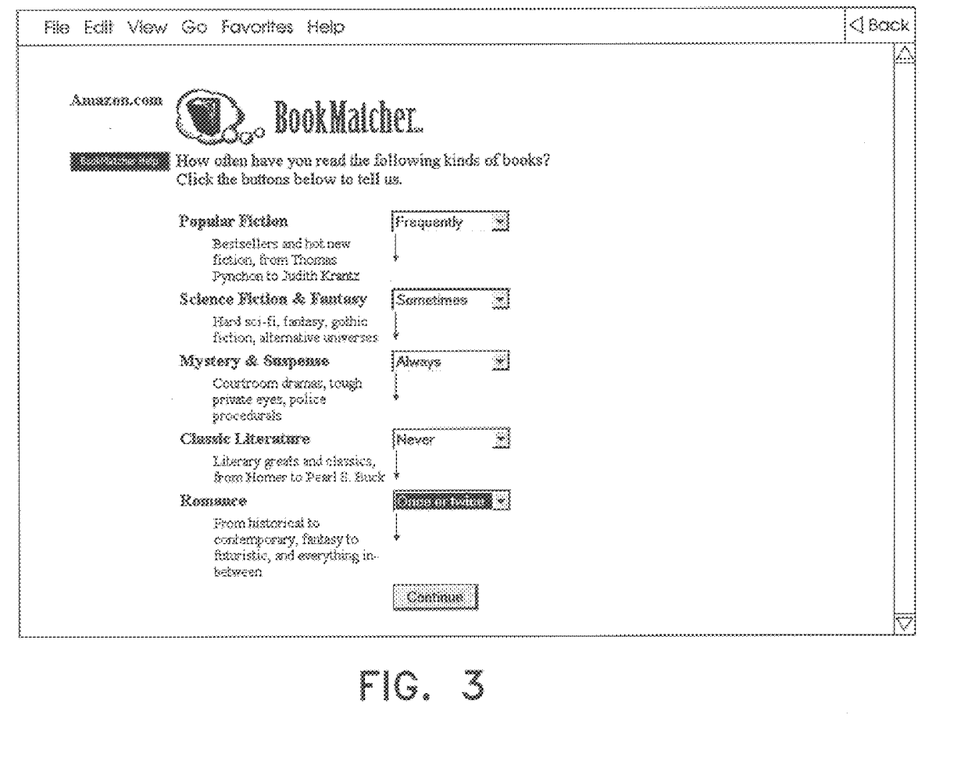
FIG. 3 illustrates a page that is used by the service to obtain category preference information from users.

FIGS. 2–6 illustrate the general operation of the BookMatcher service as seen from the perspective of an end user. As illustrated by FIG. 3, a new user of the service is initially prompted for information about the categories of books the user likes to read. The categories that are presented to the new user (five categories in the FIG. 3 example) are the currently-existing BookMatcher categories. As indicated above, books that fall within other categories (e.g., autobiographies) cannot be recommended by the service until such categories have been added to the service.

Figure 4:
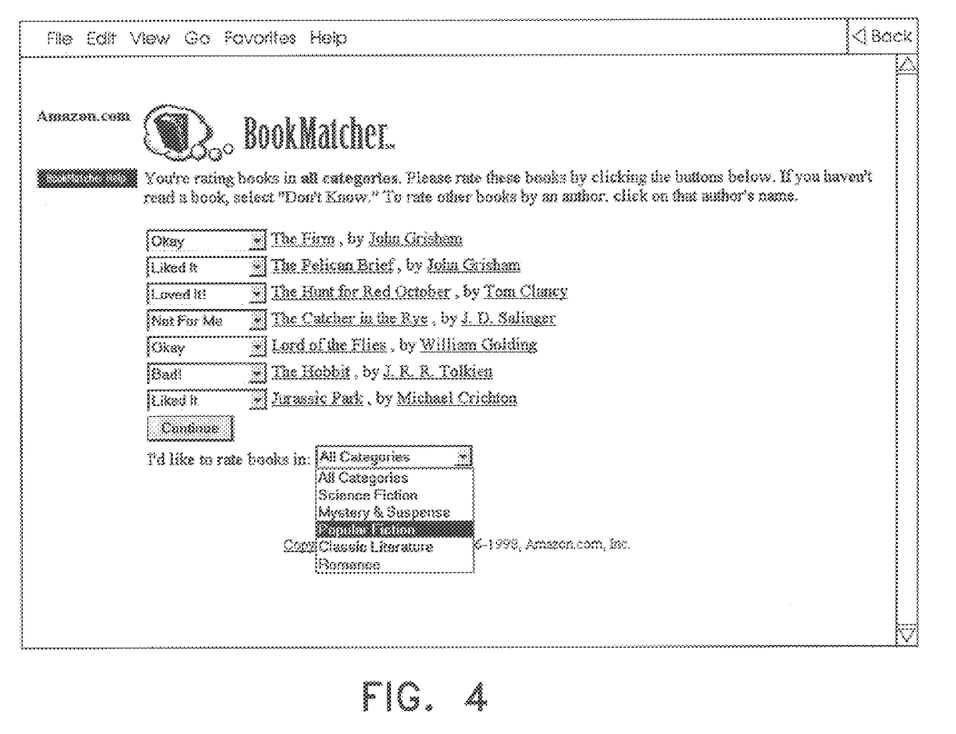
FIG. 4 illustrates a ratings page of the service.

As illustrated in FIG. 4, the user then accesses a sequence of ratings pages (one shown) in which the user is asked to rate specific titles. These titles are selected by the BookMatcher application from a startup list 64 (FIG. 1), which is a list of popular BookMatcher titles. For each book that is presented to the user, the user can select a rating of "not for me," "okay," "liked it," "loved it!," "bad," or "don't know." The purpose of this process is to allow the BookMatcher service to establish a rating profile for the new user, so that the service can thereafter use collaborative filtering techniques to generate predictions. As indicated above, the service requires the user to rate a certain minimum number of titles before allowing the user to view the service's recommendations. Users can return to the ratings pages at any time to add to their respective rating profiles.

In accordance with one feature of the invention, a process of the BookMatcher application 50 periodically (e.g., once a week) generates the startup list 64 by selecting the BookMatcher titles that are currently the most popular. This may be accomplished, for example, by selecting, in each BookMatcher (category, the BookMatcher titles that have been rated the most over the preceding week. This feature increases the likelihood that the new user will be familiar with the titles on the startup list, and thus reduces the likelihood that the user will become frustrated with the initial rating process.

To further increase the likelihood that the user will be familiar with the presented titles, the BookMatcher application uses the category preference information specified by the user to filter the startup list. For example, if the user indicates (using the form page of FIG. 3) a strong preference for classic literature over the other categories, the list presented to the user will contain more classic literature titles than titles in other categories.

With further reference to the ratings page of FIG. 4, the user can rate other books by the same author by clicking on the author's name. Depending upon the particular author, these same-author titles may include non-BookMatcher titles. Using the process described above, the ratings data generated when a user rates such a non-BookMatcher title is used (shortly after the rating event if the title falls within one of the BookMatcher categories, or at a later time if the title does not) to add the title to the service. As illustrated at the bottom of the FIG. 4 Web page, the user is also presented with the option of rating books (from the startup list 64) in specific BookMatcher categories.

Figure 5:
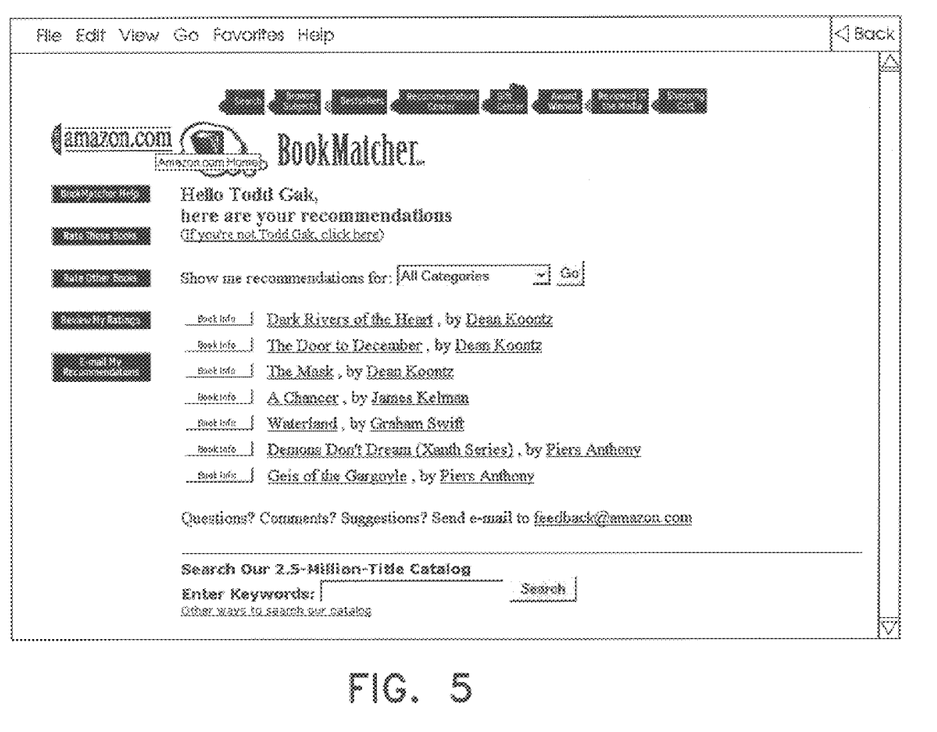
FIG. 5 illustrates an example recommendations page generated by the service.

Once the minimum number of titles have been rated (excluding "don't know" ratings), the user is presented with the option (not shown) of viewing the service's recommendations. FIG. 5 illustrates an example recommendations page returned by the BookMatcher service. From this page, the user can request the service's recommendations within specific categories (by selecting a category from the "show me recommendations for" box and then selecting the "go" button). In addition, the user can click on a recommended title to view a corresponding title information page which, as described below, allows the user to rate the title.

In the service implementation described herein, the recommendations are generated purely by the recommendation engine 54, and are generated purely using collaborative filtering techniques (i.e., by correlating the ratings of different users). In other implementation, collaborative filtering techniques can be combined with other prediction methods to generate the ultimate recommendations. For example, in the context of the FIG. 1 architecture, the BookMatcher application 50 could be provided with routines for supplementing or filtering the recommendations returned by the recommendation engine 48 based on addition information about the user, such as the user's purchasing history or geographic location. Alternatively, a recommendation service which combines collaborative filtering techniques with other types of prediction methods could be used.

Figure 6:
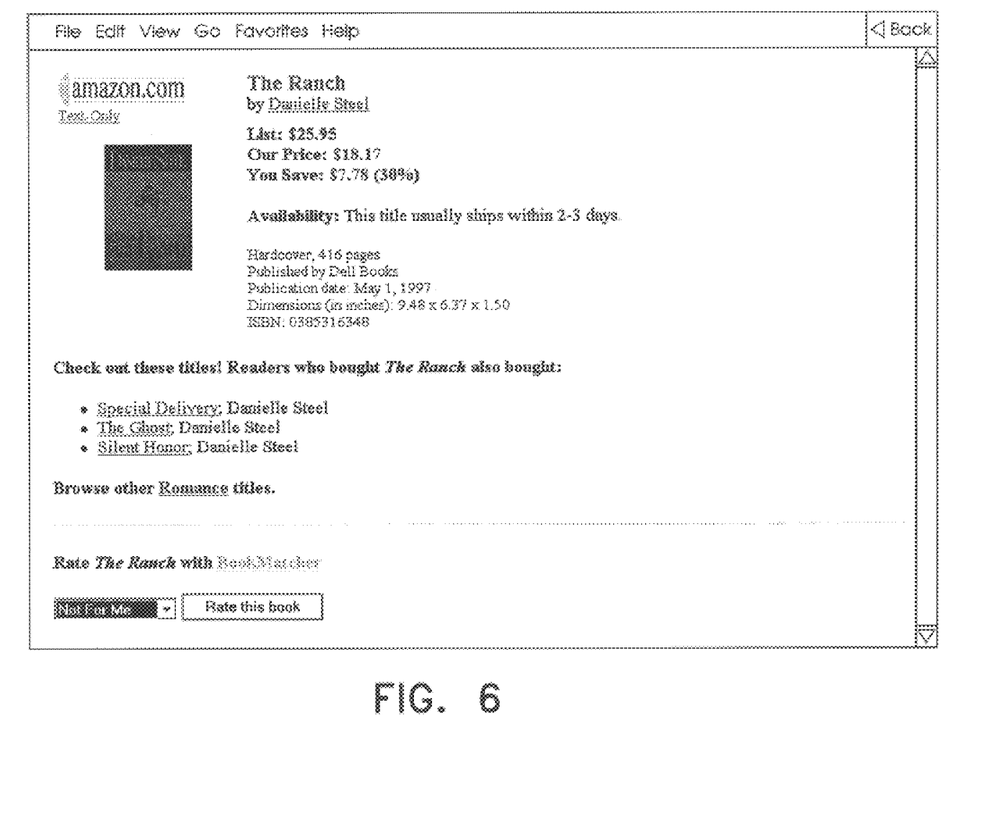
FIG. 6 illustrates an example title information as modified to allow users of the service to rate titles.

FIG. 6 illustrates an example title information page for a title that is included within the products database 40. Title information pages of the type shown can be accessed using any of a variety of the Web site's navigation aides, including the site's search engines, HTML (HyperText Markup Language) catalogs, and recommendation services. As illustrated at the bottom of the page, once a user has joined the BookMatcher service, each title information page presented to the user includes a title rating box for allowing the user to rate the title. The ratings data obtained from this process is used to augment the service (add new titles and categories) as described above. To determine whether a user of the site is a member of the BookMatcher service, the site uses cookies and other identification techniques to determine any pre-assigned user ID, and then accesses the user's profile to determine whether the user has subscribed to the service. In other implementations of the service, non-members of the service may also be presented with the option of rating titles for the purpose of augmenting the service.

Figure 7:
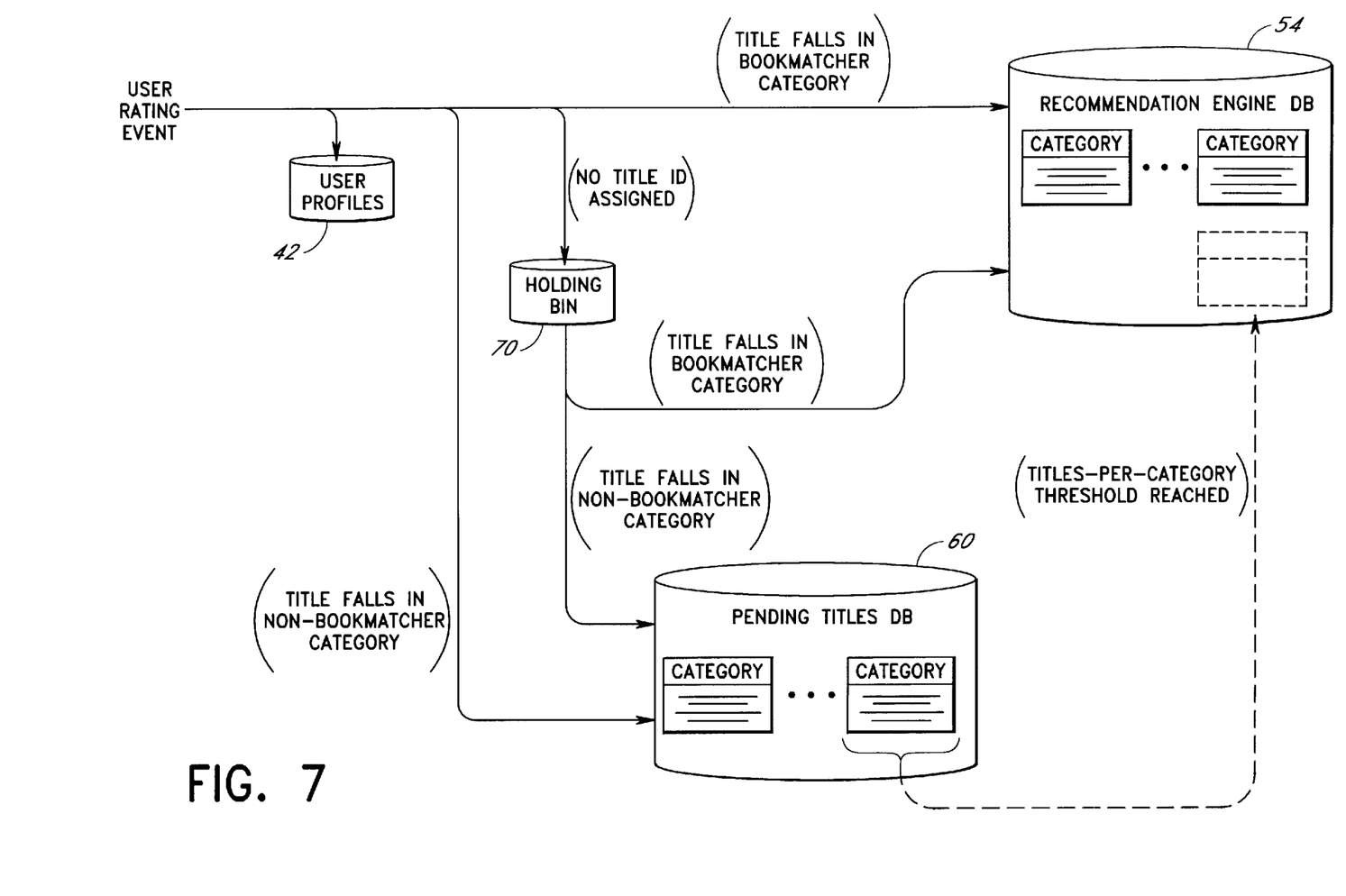
FIG. 7 illustrates the data flow paths that can be taken as users of the service rate titles.

FIG. 7 is a data flow diagram which illustrates the general operation of the FIG. 1 system when a rating event occurs. The rating event is a rating of a single title by a single user, and may take place at any area of the site (such as an initial ratings page or a title information page). The user may be either a new BookMatcher user or an existing BookMatcher user. From the perspective of the Web site, the rating event is represented by a set of ratings data that identifies the user, the rated title, and the score assigned to the title.

As depicted by the FIG. 7, the rating event is initially recorded within the user's personal profile 42 so that the data may be accessed by the various external components 34 (FIG. 1) of the site. The rating data is then also written to one of three databases: a holding bin 70, the recommendation engine database 54, or the pending titles database 60. Specifically, if the title has not yet been assigned a title ID, the rating event is recorded within the holding bin 70. (As described below, title IDs are used by BookMatcher and other services of the site to keep track of titles.) If, on the other hand, a title ID was previously assigned to the title (in which case the category or categories in which the title falls will have previously been determined), the rating event takes one of the other two paths: if the title falls within a BookMatcher category, the rating event is used to update the recommendation engine database 54 (in which case the title will be added to the service if it is not already a BookMatcher title); and if the title does not fall within a BookMatcher category, the rating event is recorded within the pending titles database 60. As described below, the categories of the titles are determined from data stored in the products database 40.

The holding bin 70 and associated program code serves the function of assigning title IDs and categories to the titles stored therein. Title IDs and categories may also be assigned by other services of the site. The title IDs are assigned such that different editions or media formats of the same title have the same title ID, even though the ISBNs (International Serial Book Numbers) of such items may be different. Categories are assigned based on BISAC (Book Industry Systems Advisory Committee) codes, Library of Congress codes, and other title information stored in the products database 40. The title IDs and categories assigned to individual titles are recorded within the products database 40.

Each time a title in the holding bin 70 is assigned a title ID and category, a determination is made whether the category is a BookMatcher category. If the category is a BookMatcher category, the rating event is recorded in the recommendation engine database 54 (in which case the title will be added to the service if it is not already a BookMatcher title). If the category is not a BookMatcher category, the rating event is recorded in the pending titles database 60. If multiple categories are assigned to the title (as is the case for certain titles), the rating event is recorded within the recommendation engine database 54 if any of these categories is a BookMatcher category, and is otherwise recorded within the pending titles database 60.

As depicted in FIG. 7, the pending titles database 60 holds titles (and associated ratings data) that belong to non- BookMatcher categories. As described above, these non-BookMatcher categories are candidates for new categories to be added to the service. As depicted by the dashed line in FIG. 7, once a sufficient number of titles exists within one of these categories, the category is added to the BookMatcher service by moving the associated ratings data (including titles IDs, user IDs and scores) to the recommendation engine database 54. The new category may be added under the control of a system administrator, or may be added automatically using a process of the BookMatcher application.

Figure 8:
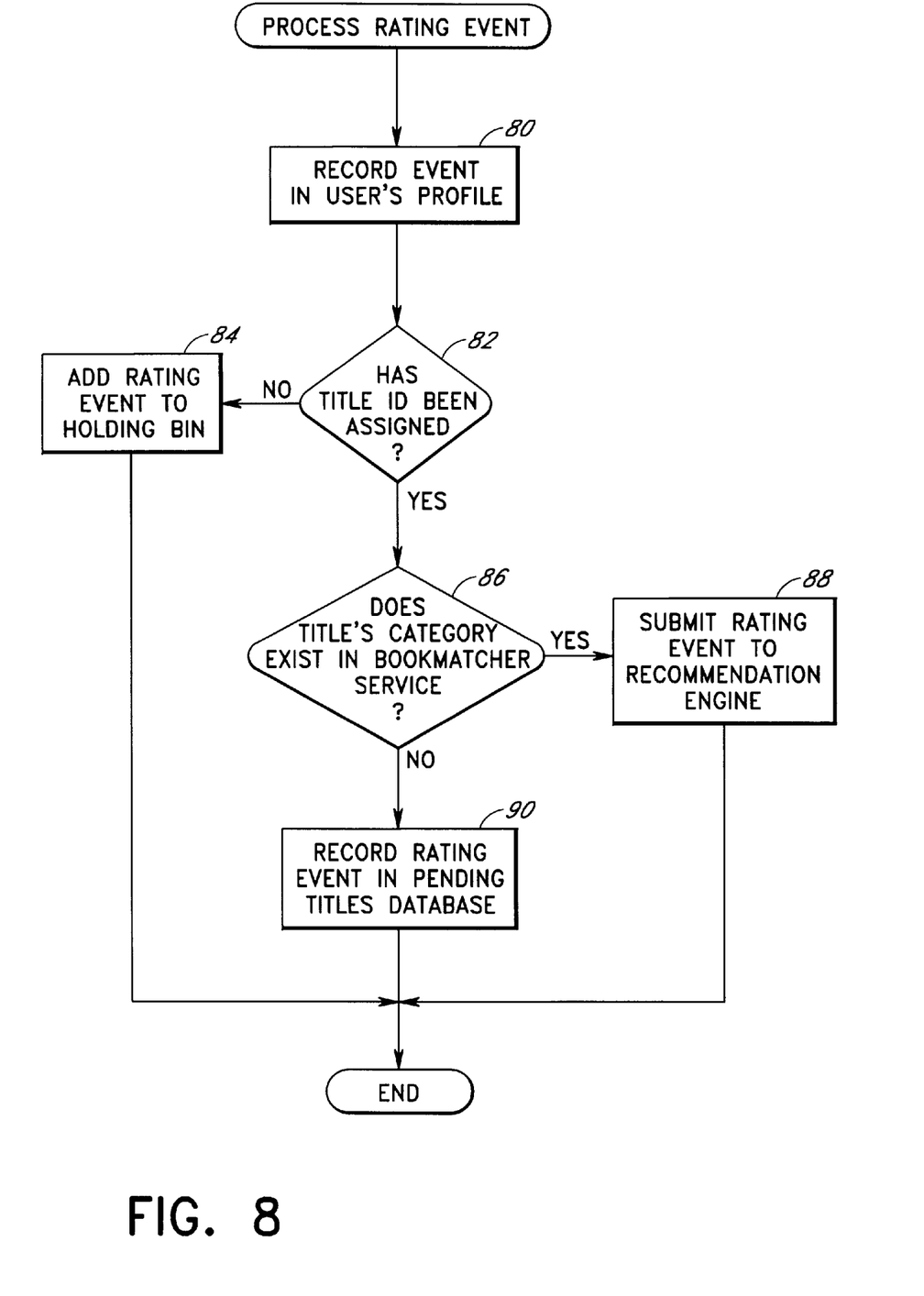
FIG. 8 illustrates a sequence of steps that are preformed to process a user rating event.
Figure 9:
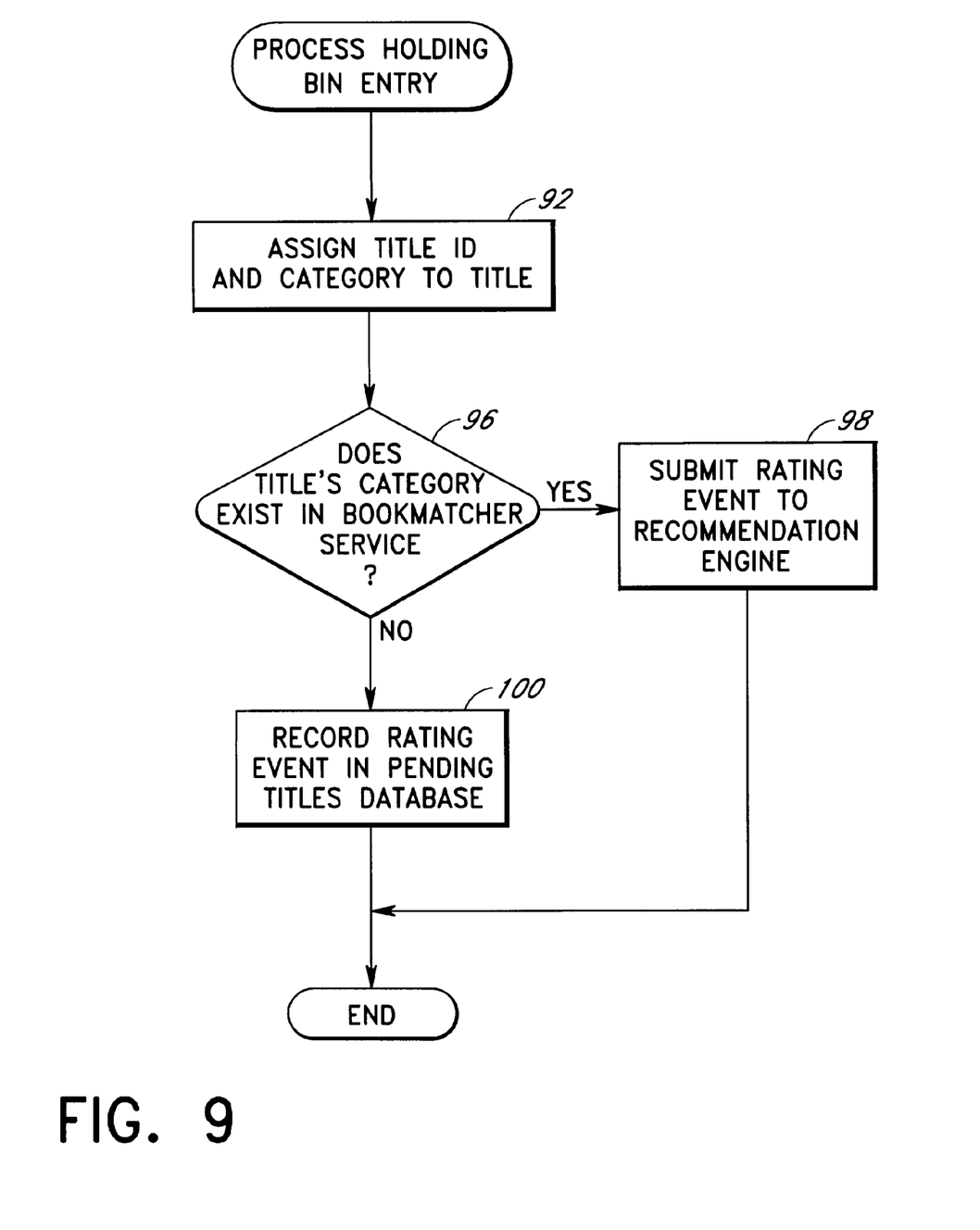
FIG. 9 illustrates a sequence of steps that are performed to process an entry within the holding bin of FIGS. 1 and 2.
Figure 10:
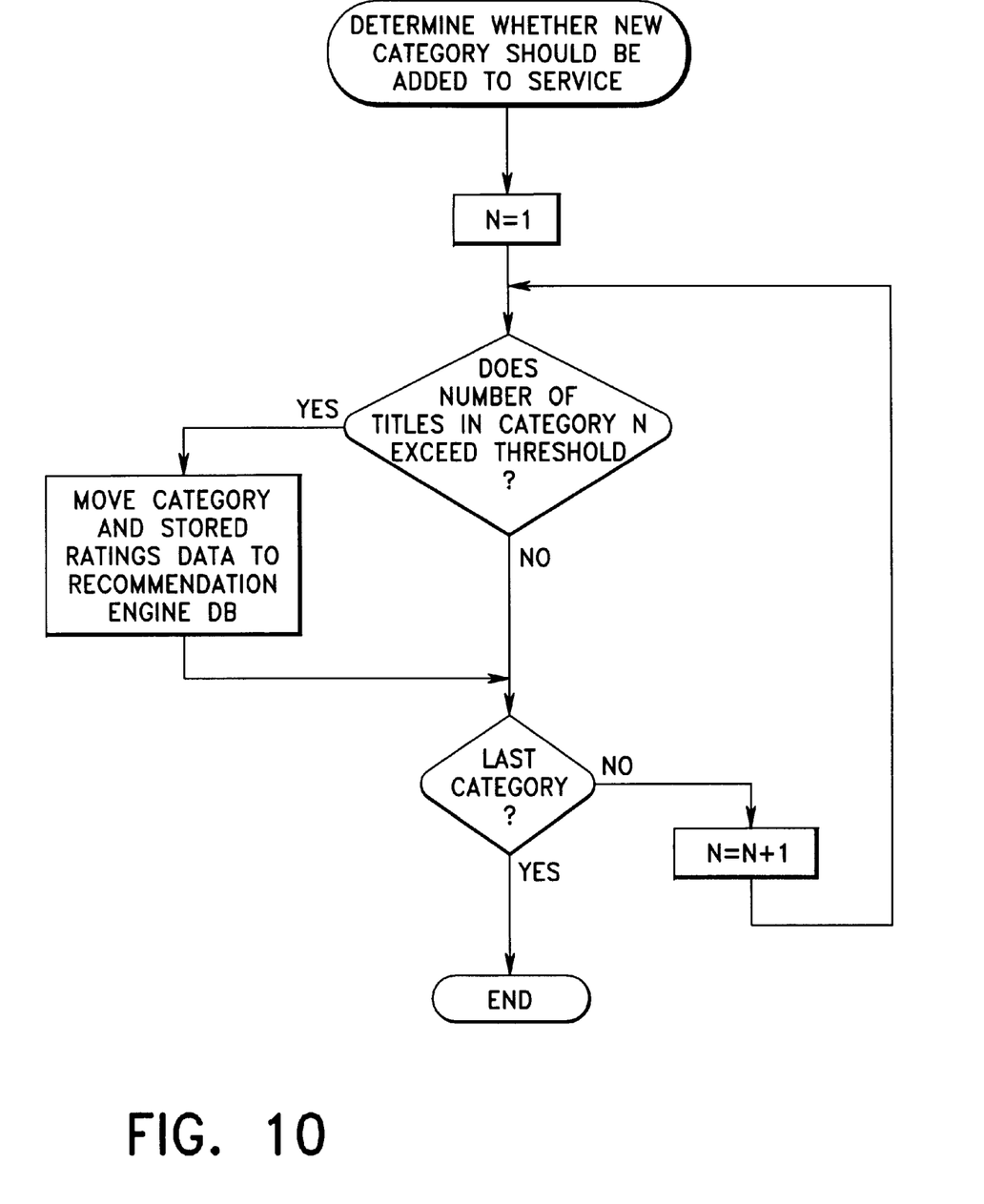
FIG. 10 illustrates a sequence of steps that are performed to determine whether any non-service categories are sufficiently developed to be added to the recommendation service.

FIGS. 8, 9 and 10 illustrate three respective BookMatcher tasks or processes that may be used to implement the data flow of FIG. 7. The process of FIG. 8 is executed whenever a rating event occurs. Multiple instances of this process may exist concurrently, since many different users of the site may rate titles at the same time. As illustrated by blocks 80 and 82, the process initially records the rating event in the user's profile, and then determines whether a title ID has been assigned to the rated title. As depicted by block 84, if no title ID has been assigned (as may be determined by accessing the products database 40), the rating event is added to the holding bin 70.

As indicated by blocks 86 and 88, if a title ID has been assigned, the process determines the title's category (by accessing the products database 40), and determines whether this category already exists within the recommendation engine database 54 (and thus the service). If the category exists within the service, the rating event is submitted to the recommendation engine 48 for addition the recommendation engine database, and the process terminates. As indicated above, this will result in the addition of the title to the service if the title is not already a BookMatcher title.

As depicted by block 90, if the category does not exist within the service, the rating event is added to the pending titles database 60. This will result in the addition of the title (as opposed to merely the user's rating) to the pending titles database 60 if the title does not already exist within the pending titles database.

FIG. 9 illustrates a process that is used to process rating events that are stored within the holding bin 70. As depicted by block 92, the process initially assigns a title ID and category to the title and stores this information in the products database 40. The process then proceeds as described above for blocks 86–90 of the FIG. 8 process.

FIG. 10 illustrates a process that can be used to automatically move categories (and associated titles and user ratings) from the pending titles database 60 to the BookMatcher service. The use of such a process, as opposes to moving the categories over manually, will be particularly useful in systems that cover large numbers of categories (e.g., over 500). The process operates by accessing the pending titles database 60 to determine, for each category, the number of pending titles that exist within that category.

If this number exceeds a pre-specified threshold (typically about 300 for a book recommendation service), the category and associated ratings data (titles and user ratings) are moved to the recommendation engine database 60, and a table (not shown) within the products database 40 is updated to reflect that the category is now part of the service. Thereafter, whenever a title that falls within the added category is rated by a user, the rating event will be added to the service (either directly or via the holding bin 70), without being passed through the pending titles database 60.

Figure 11:
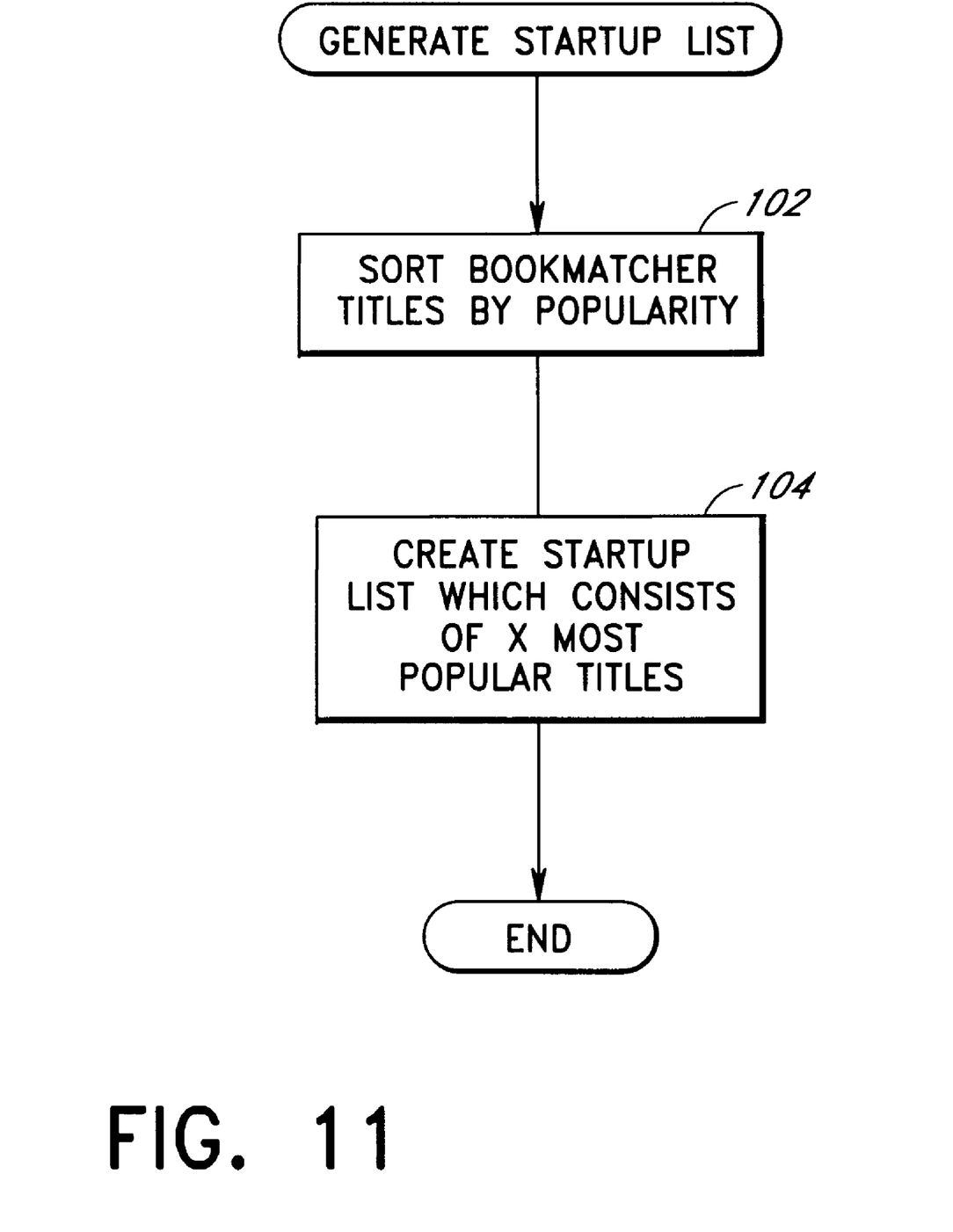
FIG. 11 illustrates a sequence of steps that are performed to generate a startup list of titles.

FIG. 11 illustrates a BookMatcher process may be executed periodically to generate a new startup list 64. As indicated above, the objective of this process is to identify those titles that new users of the service will likely be able to rate. The process operates by sorting all of the BookMatcher titles by popularity (block 102), and then creating a startup list which consists of a pre-specified number (X) of the most popular titles (block 104). This process may optionally be repeated separately for each BookMatcher category to ensure that the startup list includes an adequate number of titles from each BookMatcher category. In addition, the FIG. 11 process or its output could be modified such that certain well-known titles are always included in the startup list, regardless of the current popularity levels of such titles.

The popularity levels of the titles can be determined using any of a variety of methods. In one implementation, the popularity of each title is measured by the number of times the title has been rated over the last week. Other factors can additionally or alternatively be used, including, for example, the number of copies of the title that have been sold, the length of time the title has been available, and the average amount of time users spend browsing title on the Web site.

The foregoing description of a preferred implementation has been presented by way of example only, and should not be read in a limiting sense. The scope of the present invention is defined only by the following claims.

In the claims, reference characters used to designate claim steps are provided for convenience of description only, and are not intended to imply a particular order for performing the steps.

What is claimed is:

1. A method of adding items and predefined item categories to a recommendation service that uses collaborative filtering to recommend items to users from a set of service items within a set of service categories, comprising:

providing users an option to rate items, including non-service-items and items in non-service-categories;

when a user rates a non-service-item that falls within a service category, adding the non-service-item to the service;

when a user rates a non-service-item that does not fall within any service category, recording the item and associated user rating in a repository without adding the item to the service; and when a quantity of rated items recorded within the repository for a non-service-category reaches a level that represents a desired degree of reliability for recommending items within that category, adding the category and associated rated items to the service.

2. The method as in claim 1, wherein the items comprise book titles, and the item categories comprise book genres.

3. The method as in claim 1, wherein providing users an option to rate items comprises presenting users of the recommendation service modified web pages that include forms for rating items during browsing of an electronic catalog.

4. The method as in claim 1, wherein adding the category and associated rated items to the service comprises moving user ratings data for a plurality of items from the repository to a database of the recommendation service.

5. The method as in claim 1, wherein adding the category and associated rated items to the service is performed automatically in response to an items-per-category threshold being reached within the repository.

6. The method as in claim 1, wherein adding the category and associated rated items to the service is performed under the control of a system administrator.

7. The method as in claim 1, further comprising providing users an option to select a service category in which to obtain category-specific recommendations.

8. A method of adding predefined item categories to a recommendation service that uses collaborative filtering to recommend items to users from a set of service categories, comprising:

provclaimiding users an option to rate individual items, including items that do not fall within any service category;

when a user rates an item that does not fall within any service category, recording the item and associated user rating in a repository without adding the item to the service; and when a quantity of rated items recorded within the repository for a non-service-category reaches a level that represents a desired degree of reliability for recommending items within that category, adding the non-service-category to the service.

9. The method as in claim 8, wherein the items comprise book titles, and the item categories comprise book genres.

10. The method as in claim 8, wherein providing users an option to rate items comprises presenting users of the recommendation service modified web pages that include forms for rating items during browsing of an electronic catalog.

11. The method as in claim 8, wherein adding the non-service-category to the service comprises moving user ratings data for a plurality of items from the repository to a database of the recommendation service.

12. The method as in claim 8, wherein adding the non-service-category to the service is performed automatically in response to an items-per-category threshold being reached within the repository.

13. The method as in claim 8, wherein adding the non-service-category to the service is performed under the control of a system administrator.

14. The method as in claim 8, further comprising providing users an option to select a service category in which to obtain category-specific recommendations.

15. In a computer-implemented collaborative recommendations service in which items are recommended to users from a database within a set of service categories, the set of service categories being a subset of the item categories of the database, a method of adding categories to the service, comprising:

(a) prompting users to rate items that fall outside the set of service categories;

(b) storing ratings data resulting from (a) without adding the rated items to the service; and (c) when a quantity of ratings data stored in (b) for a non-service-category of the database reaches a selected level that represents a desired degree of reliability for recommending items in the non-service-category, adding the non-service-category to the service.

16. The method as in claim 15, wherein the items comprise book titles, and the item categories comprise book genres.

17. The method as in claim 15, wherein prompting users to rate items comprises presenting users of the recommendation service modified web pages that include forms for rating items during browsing of an electronic catalog.

18. The method as in claim 15, wherein adding the non-service-category to the service comprises moving user ratings data for a plurality of items from a repository to a database of recommendable items.

19. The method as in claim 15, wherein adding the non-service-category to the service is performed automatically in response to an items-per-category threshold being reached.

20. The method as in claim 15, wherein adding the non-service-category to the service is performed under the control of a system administrator.

21. The method as in claim 15, further comprising providing users an option to select a service category in which to obtain category-specific recommendations.

22. A system that implements a recommendation service, comprising:

a database of items that fall within a plurality of categories;

a recommendation service component which recommends items to users from the database within a subset of the plurality of categories ("service categories") using a collaborative filtering method; and a service populating component which:

provides users an option to rate items, including non-service-items and items in non-service-categories;

when a user rates a non-service-item that falls within a service category, adds the non-service-item to the service; and when a user rates a non-service-item that does not fall within any service category, records the item and associated user rating without adding the item to the service, to thereby collect data for adding non-service-categories to the service as desired rated-items per category levels are reached.

23. The system as in claim 22, wherein the service populating component automatically adds a non-service-category to the service when a rated-items per category threshold for that category is reached.

24. The system as in claim 22, wherein the items comprise book titles, and the predefined item categories comprise book genres.

25. A method for generating a ratings profile for use within a recommendation service that recommends items to users within multiple service categories, comprising:

prompting the user to specify a preference level for each of a plurality of the service categories;

using the preference levels specified by the user to generate a list of items that reflects the user's category preferences; and prompting the user to rate items from the list.

26. The method as in claim 25, wherein using the preference levels to generate a list comprises using the preference levels to filter a startup list.

* * * * *